(12) United States Patent
Jones et al.

(10) Patent No.: US 7,849,356 B2
(45) Date of Patent: Dec. 7, 2010

(54) PARITY DATA MANAGEMENT SYSTEM APPARATUS AND METHOD

(75) Inventors: Michael John Jones, Cedar Park, TX (US); David Ray Kahler, Tucson, AZ (US); Robert Akira Kubo, Tucson, AZ (US); Karl Allen Nielsen, Tucson, AZ (US); Cheng-Chung Song, Tucson, AZ (US); William Henry Travis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/016,037

(22) Filed: Jan. 17, 2008

(65) Prior Publication Data

US 2009/0187786 A1    Jul. 23, 2009

(51) Int. Cl.
*G06F 11/00* (2006.01)
(52) U.S. Cl. ............................................. 714/6; 714/9
(58) Field of Classification Search ....................... None
See application file for complete search history.

(56) References Cited

U.S. PATENT DOCUMENTS

| | | | | |
|---|---|---|---|---|
| 5,533,190 A * | 7/1996 | Binford et al. | ............... | 714/6 |
| 5,546,558 A | 8/1996 | Jacobson et al. | ............. | 395/441 |
| 5,548,711 A | 8/1996 | Brant et al. | ............. | 395/182.03 |
| 5,774,643 A * | 6/1998 | Lubbers et al. | ............... | 714/20 |
| 5,826,001 A | 10/1998 | Lubbers et al. | ........ | 395/182.04 |
| 5,958,067 A * | 9/1999 | Kaneda et al. | ............... | 714/6 |
| 6,237,052 B1 | 5/2001 | Stolowitz | ............... | 710/61 |
| 6,549,977 B1 | 4/2003 | Horst et al. | ............... | 711/113 |
| 7,069,382 B2 | 6/2006 | Horn et al. | ............... | 711/114 |
| 2002/0170017 A1 | 11/2002 | Busser | ............... | 714/800 |
| 2003/0204774 A1 * | 10/2003 | Humlicek et al. | ............... | 714/6 |
| 2004/0078508 A1 | 4/2004 | Rivard | ............... | 711/4 |
| 2005/0210317 A1 * | 9/2005 | Thorpe et al. | ............... | 714/6 |
| 2006/0123270 A1 * | 6/2006 | Forhan et al. | ............... | 714/6 |
| 2007/0088975 A1 * | 4/2007 | Ashmore et al. | ............... | 714/6 |
| 2007/0288792 A1 * | 12/2007 | Thorpe et al. | ............... | 714/6 |

* cited by examiner

*Primary Examiner*—Michael C Maskulinski
(74) *Attorney, Agent, or Firm*—Kunzler Needham Massey & Thorpe

(57) ABSTRACT

An apparatus for parity data management receives a write command and write data from a computing device. The apparatus also builds a parity control structure corresponding to updating a redundant disk array with the write data and stores the parity control structure in a persistent memory buffer of the computing device. The apparatus also updates the redundant disk array with the write data in accordance with a parity control map and restores the RAID controller parity map from the parity control structure as part of a data recovery operation if updating the redundant disk array with the write data is interrupted by a RAID controller failure resulting in a loss of the RAID controller parity map. In certain embodiments, the parity control structure is a RAID controller parity map.

19 Claims, 13 Drawing Sheets

PARITY DATA MANAGEMENT SYSTEM APPARATUS AND METHOD

BACKGROUND OF THE INVENTION

1. Field of the Invention

This invention relates to systems, apparatus, and methods for storing data and more particularly relates to systems, apparatus, and methods for managing redundant data.

2. Description of the Related Art

Dependable data storage solutions have always been a focus of effective computer networks and information systems. One approach to dependable data storage includes using a controller in conjunction with a redundant array of independent disks (RAID) to create multiple copies of data. This way, should one copy of the data be destroyed, other copies of the data still exist. Though currently available RAID controllers are effective at creating redundant data, certain problems exist.

For example, when a RAID controller receives write data from a computer, the RAID controller creates or updates a parity control map to track which data stripes of a redundant disk array will be updated by committing the write data. A redundant disk array may include a plurality of data stripes each having multiple data strips and a parity strip. Next, the RAID controller updates the appropriate data strips with the write data and communicates to the computer that the write data has been committed. Then, the RAID controller updates the parity strip corresponding to the updated data strip to ensure that the parity disk is up-to-date. In some embodiments, the parity update could be performed in parallel with the data update and completion notification. Once the data and parity strips are updated, the RAID controller updates the parity control map to indicate that there are no outstanding data/parity inconsistencies.

If the RAID controller is interrupted, resulting in a loss of volatile memory data, after communicating to the computer that the write data has been committed and before updating the appropriate parity strip (assuming the parity control map is still available) the RAID controller may rely on the parity control map in the non-volatile memory to indicate which parity strip needs to be updated and derive an up-to-date parity strip via one or more data recovery operations such as an exclusive OR operation. If, however, the interruption to the RAID controller results in a complete loss of data including the parity control map, the RAID controller is unable to determine which, if any, parity strips are out dated. Such a scenario leaves the redundant disk array inconsistent. In certain scenarios, the foregoing interruption could result from replacing an old RAID controller with a new RAID controller as the new RAID controller would not include sufficient parity information to complete the appropriate parity update(s).

SUMMARY OF THE INVENTION

The present invention has been developed in response to the present state of the art, and in particular, in response to the problems and needs in the art that have not yet been fully solved by currently available failure data collection solutions. Accordingly, the present invention has been developed to provide an apparatus, system, and method for parity data management.

In one aspect of the present invention, an enhanced system for parity data management includes a first computing device that communicates a write command and data to a first RAID controller that receives the write command and builds a parity control structure in accordance with updating a data stripe of a redundant disk array with the write data. One data stripe may include a plurality of data strips and a corresponding parity strip.

The first RAID controller stores the parity control structure in a persistent memory buffer of the first computing device. The first RAID controller also updates the data stripe with the write data in accordance with a RAID controller parity map. If updating the data stripe is interrupted by a RAID controller failure resulting in a loss of the RAID controller parity map, the first RAID controller restores the RAID controller parity map from the parity control structure stored in the persistent memory buffer of the first computing device as part of a data recovery operation.

In certain embodiments, the first RAID controller also communicates the parity control structure to a second RAID controller that in turn stores the parity control structure in the persistent memory of a second computing device. In some embodiments, the first RAID controller restores the RAID controller parity map from the additional computing device if restoration of the RAID controller parity map from the first computing device is unsuccessful. In some embodiments, the first and second raid controllers discard the parity control structures in the persistent memories of the first and second computing devices once the data stripe is updated with the write data.

In one aspect of the present invention an apparatus for parity data management includes communication modules that receives a write command and write data from a computing device. The apparatus also includes a parity module that builds a parity control structure in accordance with updating a redundant disk array with the write data and stores the parity control structure in the persistent memory of the computing device. The apparatus also includes a redundant array update module configured to update the redundant disk array with the write data in accordance with a RAID controller parity map, and a data recovery module that restores the RAID controller parity map from the parity control structure stored on the computing device as part of a data recovery operation if committing the write command to the redundant disk array is interrupted by a RAID controller failure resulting in a loss of the RAID controller parity map.

In certain embodiments, the parity control structure is a RAID controller parity map. In other embodiments, the parity control structure is a RAID controller parity map and exclusive-OR data corresponding to committing the write command to the parity control structure.

A method of the present invention is also presented for managing parity data. The method in the disclosed embodiments substantially includes the operations necessary to carry out the functions presented above with respect to the described system and apparatus. In one embodiment, the method includes receiving a write command and write data from a computing device and building a parity control structure in accordance with updating a redundant disk array with the write data. The method may also include storing the parity control structure in the persistent memory of a computing device and updating the redundant disk array with the write data in accordance with a RAID controller parity map. Furthermore, the method may include restoring the RAID controller parity map from the parity control structure stored on the computing device as part of a data recovery operation if updating the redundant disk array with the write command is interrupted by a RAID controller failure that results in a loss of the RAID controller parity map.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
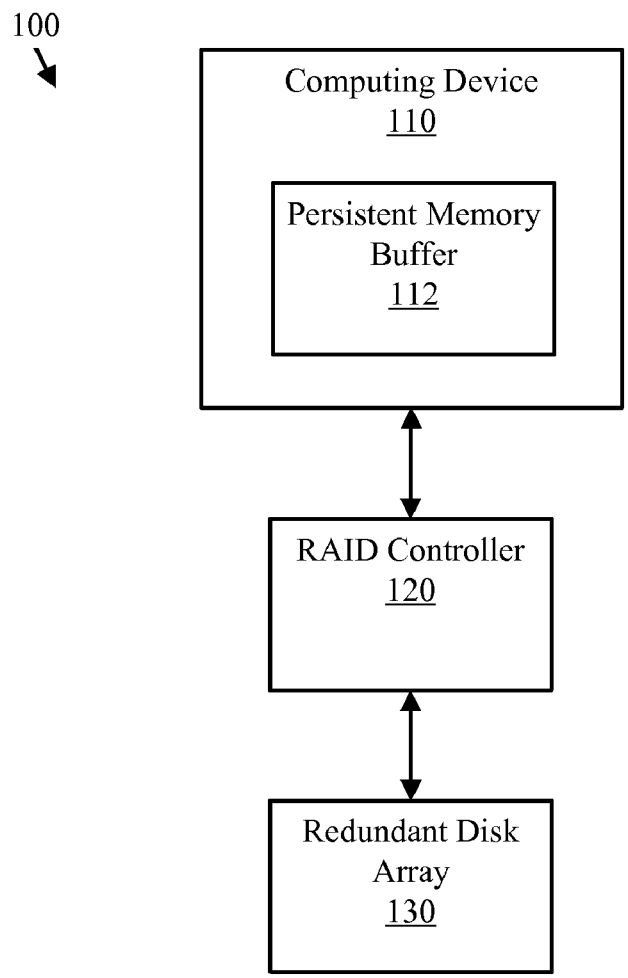
FIG. 1 is a schematic block diagram of one embodiment of a parity data management system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram of one embodiment of a parity management system 100 in accordance with the present invention. The depicted system 100 includes a computing device 110, a RAID controller 120, and a redundant disk array 130. The components of the system 100 cooperate to manage parity data.

The computing device 110 communicates one or more write commands with write data to the RAID controller 120. The RAID controller 120 receives the write data and builds a parity control structure corresponding to updating the redundant disk array 130 with the write data. The RAID controller 120 stores the parity control structure in the persistent memory buffer 112. In some embodiments, the persistent memory buffer protects against power loss. The persistent memory may include a fire hose dump (FHD) device or battery-backed memory. In some embodiments, the parity control structure may be stored in a memory device configured to store other back up data such as a fire hose dump memory device.

The RAID controller 120 commits the write data to the redundant disk array 130 in accordance with a RAID controller parity map. If committing the write command is interrupted by a RAID controller failure event resulting in a loss of the RAID controller parity map, the RAID controller 120 restores the RAID controller parity map as part of a data recovery operation from the parity control structure stored in the persistent memory buffer 112. Accordingly, the system 100 enables RAID controller data recovery operations even when a RAID controller failure results in a loss of the RAID controller parity map.

Figure 2:
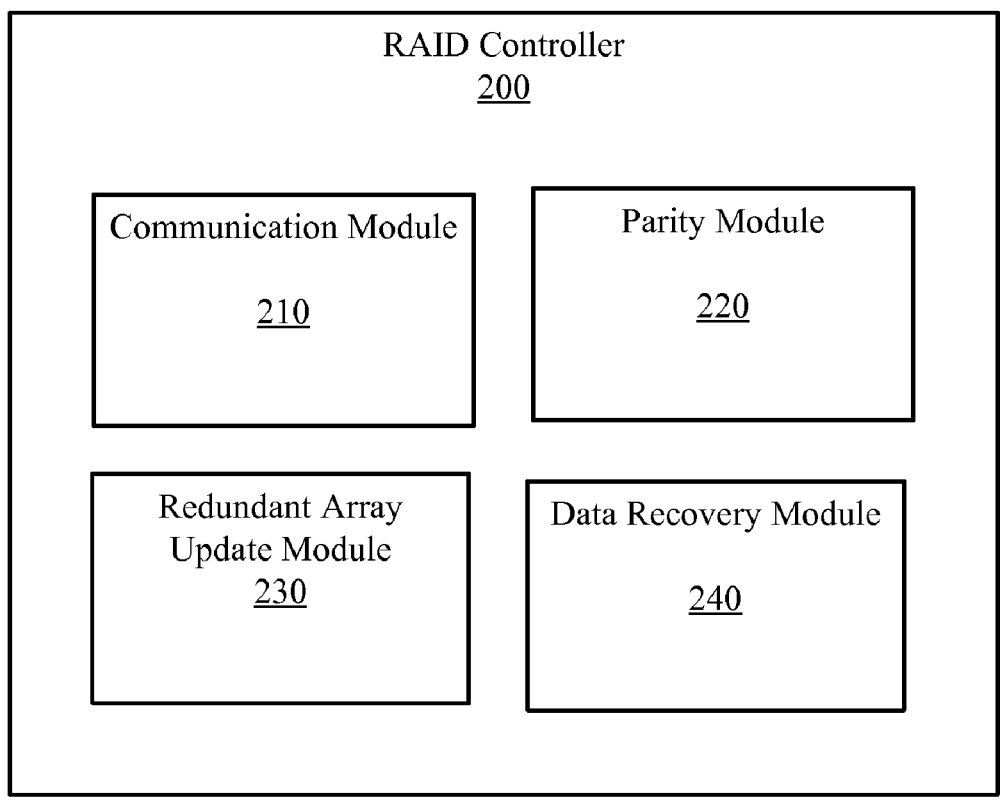
FIG. 2 is a schematic block diagram of one embodiment of a RAID controller in accordance with the present invention.

FIG. 2 is a schematic block diagram of one embodiment of a RAID controller 200 in accordance with the present invention. The depicted RAID controller 200 includes a communication module 210, a parity module 220, a redundant array update module 230, and a data recovery module 240. In certain embodiments, the RAID controller 200 corresponds to the RAID controller 120 depicted in FIG. 1.

The communication module 210 receives one or more write commands from a computing device 110. A write command may include write data for updating a redundant disk array 130. The parity module 220 builds a parity control structure corresponding to updating a redundant disk array 130 with the write data. In some embodiments, the parity control structure corresponds to a parity control map. In some embodiments, the parity control structure corresponds to data in doubt and parity in doubt marks. In some embodiments, the parity control structure includes a combination of a parity control map, exclusive OR data, or other data necessary or helpful to performing a RAID controller data recovery operation.

The parity module 210 stores the parity control structure in a persistent memory buffer 112 of a computing device 110. The redundant array update module 230 commits the write data to a redundant disk array 130 in accordance with a parity control map. If committing the write data is interrupted by a RAID controller failure that results in the loss of the parity control map, the data recovery module 240 restores the parity control map by accessing the parity control structure stored in the persistent memory buffer 112 of the computing device 110 as part of a RAID controller data recovery operation.

Storing the parity control structure in the persistent memory buffer 112 of the computing device 110 ensure that, even if the RAID controller 200 somehow loses the parity control map by a crash, power failure, or otherwise, the RAID controller 200 may restore the parity control map by accessing the parity control structure stored in the persistent memory buffer 112. Additionally, storing the parity control structure on the computing device 110 instead of the RAID controller 200 eliminates the need for requiring each RAID controller of a system to include a persistent memory system such as a battery-backed RAM memory.

Eliminating such a need reduces the complexity, componentry, and cost of a RAID controller by capitalizing on the already-available data storage capacities of the computing device 110. In some embodiments, the redundant array update module discards the parity control structure from the persistent memory 112 of the computing device once the data stripe is updated with the write data, to ensure that the persistent memory buffer does not become overburden multiple parity control structures.

The schematic flow chart diagram that follows is generally set forth as logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
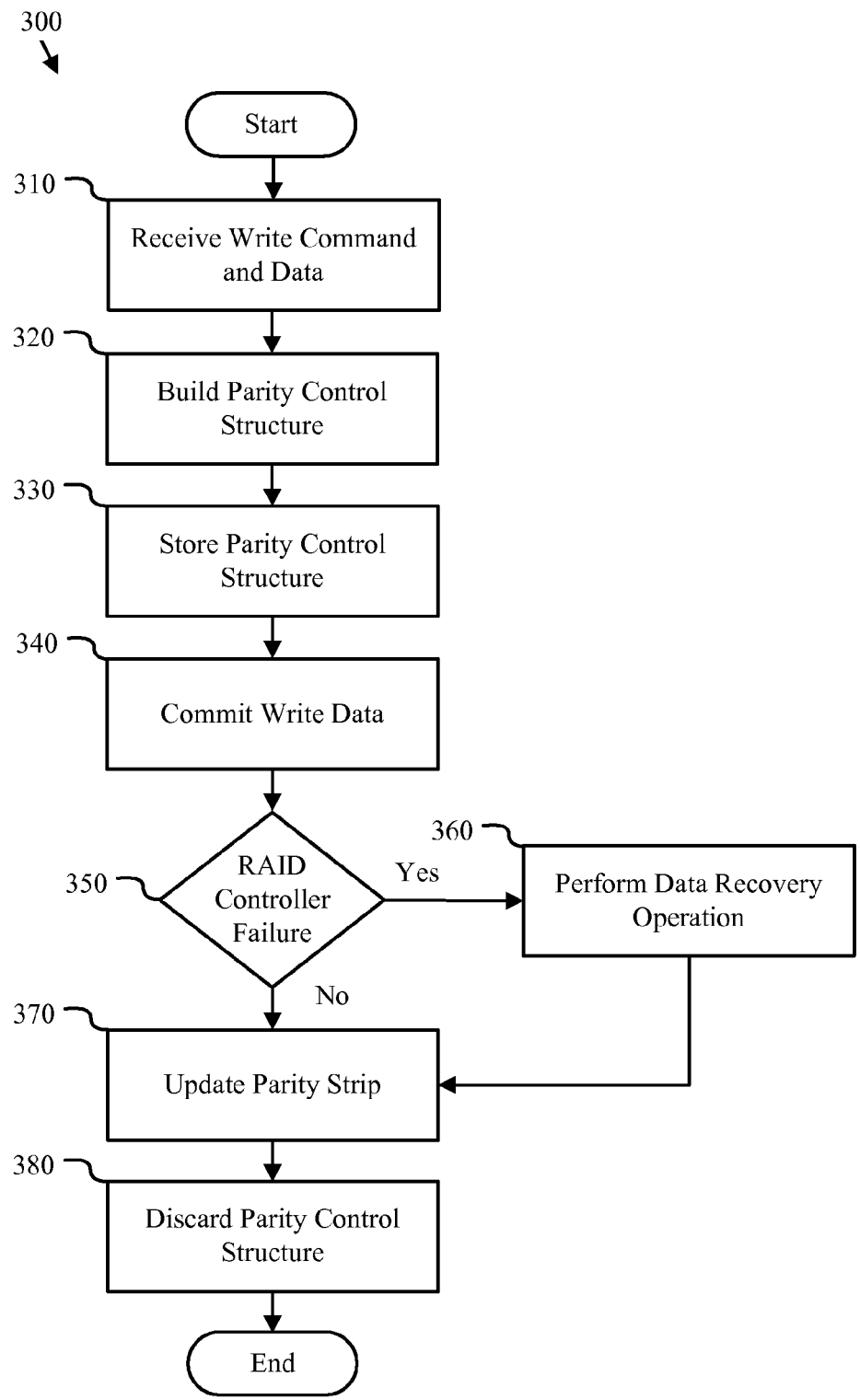
FIG. 3 is flow chart diagram of one embodiment of a parity data management method in accordance with the present invention.

FIG. 3 is flow chart diagram of one embodiment of a redundant data management method 300 in accordance with the present invention. The depicted method 300 includes the operations of receiving 310 a write command and write data, building 320 a parity control structure, storing 330 the parity control structure, committing 340 the write data, a raid controller failure 350, performing 360 a data recovery operation, updating 370 a parity strip, and discarding 380 the parity control structure. The operations of the method 300 collectively depict one solution for managing redundant data in accordance with the present invention.

Receiving a write command and write data 310 may includes a RAID controller 120 receiving one or more write commands from a computing device 110. Building 320 a parity control structure may include building a parity control structure corresponding to updating a redundant disk array with the write data received. Storing 330 the parity control structure may include a RAID controller 120 storing the parity control structure in the persistent memory 112 of a computing device 110.

Committing 340 the write data may include updating a redundant disk array with the write data in accordance with the RAID controller 120 map. A RAID controller failure 350 may include any type or version of a RAID controller failure such as a volatile or non-volatile memory failure, a power surge, a power outage, or any other such event resulting in the loss of the parity control structure. The RAID controller failure 350 may also result in the loss of data in the volatile memory, such as the write data, exclusive OR data, or data regarding an exposed parity.

Performing 360 a data recovery operation 360 may include a RAID controller 120 performing an operation to recover data lost as part of the RAID controller failure including restoring the parity control map from the parity control structure stored on the computing device. In some embodiments, the parity control structure may facilitate the restoration of other lost data, in addition to the parity control map. Performing 360 a data recovery operation 360 may also include utilizing the restored parity map and restoration data to properly update the redundant disk array 130. Updating 370 a parity strip may include updating a parity strip corresponding to the write data received. Depending upon the scenario, updating 370 a parity strip may include updating a parity strip from the write data as part of a more standard parity update operation, or from the parity control structure previously built 320 and stored 330. Discarding 380 the parity control structure may include removing the parity control structure stored in the persistent memory 112 of the computing device 110.

Figure 4:
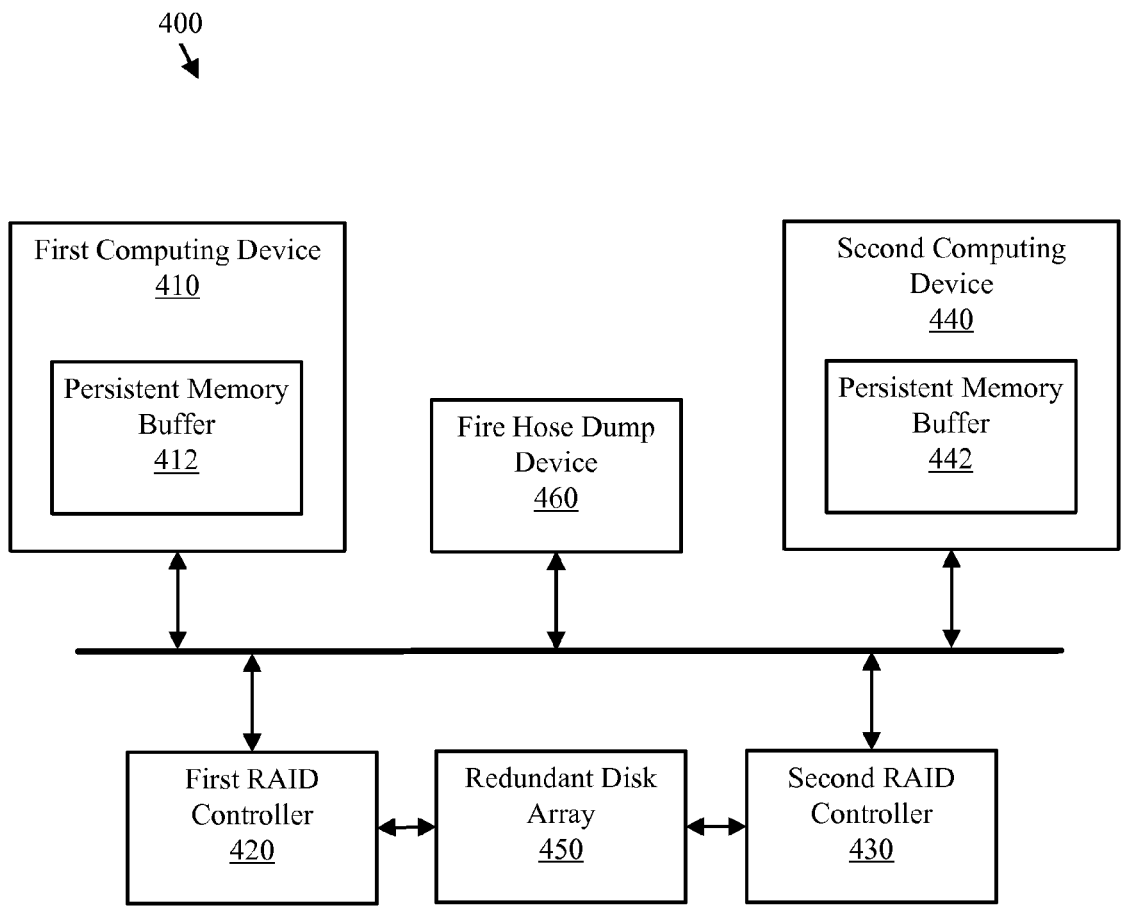
FIG. 4 is a schematic block diagram of one embodiment of a parity data management system in accordance with the present invention.

FIG. 4 is a schematic block diagram of one embodiment of a parity management system 400 in accordance with the present invention. The depicted system 400 includes a first computing device 410, a first RAID controller 420, a second RAID controller 430, a second computing device 440, a redundant disk array 450, and a fire hose dump device 460. The components of the system 400 operate harmoniously to ensure that the redundant disk array 450 is updated properly.

The first computing device 410 communicates one or more write commands and write data to the first RAID controller 420. The first RAID controller 420 builds a parity control structure corresponding to the write data. The first RAID controller 420 stores the parity control structure (not shown)

in the persistent memory buffer 412 of the first computing device 410. The first RAID controller 420 also communicates the parity control structure to the second RAID controller 430.

The second RAID controller 430 stores the parity control structure in the persistent memory buffer 442 of the second computing device 440. It should be noted that, at this point, copies of the parity control structure are stored in two separate persistent memory buffers 412 and 442. Accordingly, even if the first RAID controller fails and the first computing device fails, there will still be a copy of the parity control structure available on the second computing device 440 to facilitate a RAID controller data recovery operation. Additionally, should the first computing device 410 fail for example, the parity control structure stored in the persistent memory 412 of the first computing device 410 may be unloaded to the fire hose dump device 460 via a fire hose dump operation.

In certain embodiments, the first and second RAID controllers 420 and 430 communicate with the first and second computing devices 410 and 440 using a peripheral component interconnect (PCI) fabric/mapped memory so the raid controllers 420, 430 may control the persistent memory content through direct memory access with minimal assistance from the computing devices 410 and 440. In some embodiments, the computing devices 410 and 440 communicate via a PCI fabric, and the RAID controllers 420 and 430 communicate with the redundant disk array 450 via a fiber channel, serial storage architecture (SSA) fabric, serial attached SCSI (SAS) fabric, or similar technology.

After the first RAID controller 420 communicates the parity control structure to the first computing device 410 and the second RAID controller 430, the first RAID controller 420 updates the redundant disk array 450 with the write data. If updating the redundant disk array 450 is interrupted and the parity control map corresponding thereto is lost, the first RAID controller 420 may restore the parity control map from the parity control structure stored in the persistent memory buffers 412, 442 as part of an appropriate data recovery operation. In certain embodiments, the second RAID controller 430 performs the appropriate data recovery operation instead of the first RAID controller 420. Such an embodiment provides a solution for scenarios where the first RAID controller 420 will be operable for extended periods of time or where the interruption results in a need to replace the first RAID controller 420. In this manner, the present invention ensures a robust solution for managing redundant data.

FIGS. 5a-5i are schematic block diagrams of one embodiment of a parity data management system 500 in accordance with the present invention. Viewed collectively, FIGS. 5a-5i illustrate interactions between a computing device 510, RAID controller 520, and a redundant disk array 530 consistent with some embodiments of the present invention. FIGS. 5a-5i also collectively illustrate a solution for managing parity data in accordance with the present invention.

Figure 5A:
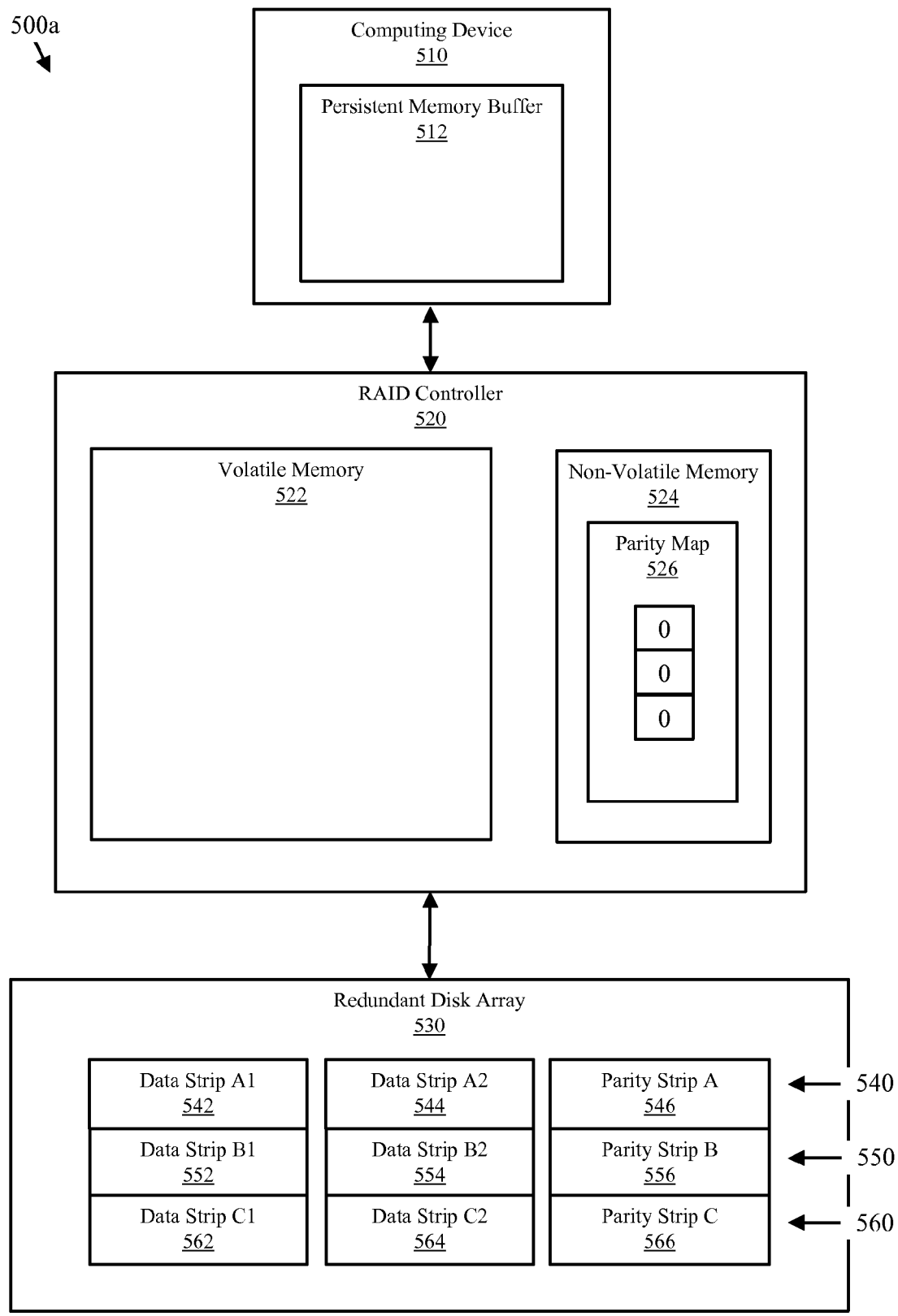
FIGS. 5a-5i are schematic block diagrams of one embodiment of a parity data management system in accordance with the present invention.

Referring to FIG. 5a, the system 500a includes a computing device 510, a RAID controller 520, and a redundant disk array 530. The computing device 510 includes a persistent memory buffer 512 that may include a battery-backed memory device, a fire hose dump device, and more. The RAID controller 520 includes a volatile memory 522 and a non-volatile memory 524 with a parity map 526. The redundant disk array 530 includes three data stripes 540, 550, and 560. Each data stripe includes two data strips and a corresponding parity strip. For example, data stripe 540 includes data strip A1 (542), data strip A2 (544), and parity strip A (546). It should be noted that the parity map 526 displays three "0" marks indicating that all the data stripes 540, 550, 560 of the redundant disk array 530 are up-to-date.

Figure 5B:
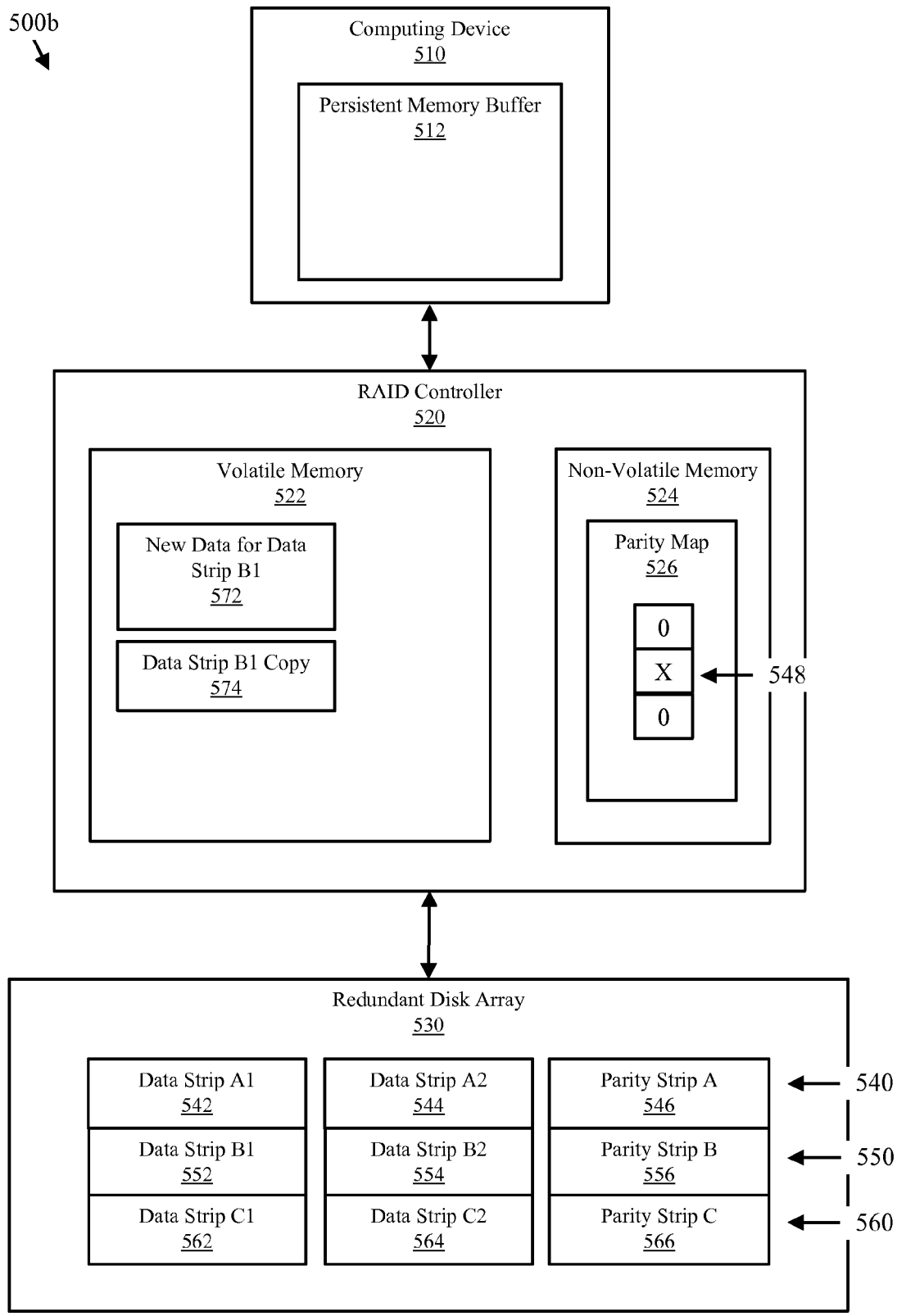

Referring to FIG. 5b, the computing device 510 communicates new data for data strip B1 (572) to the RAID controller 520. In response thereto, the RAID controller 520 creates a copy of data strip B1 (574) in the volatile memory 522 and updates the parity map 526 with an "X" 548 to indicate that committing the new data will result in an inconsistent data stripe 550 until parity strip B (556) is updated to reflect the new data.

Figure 5C:
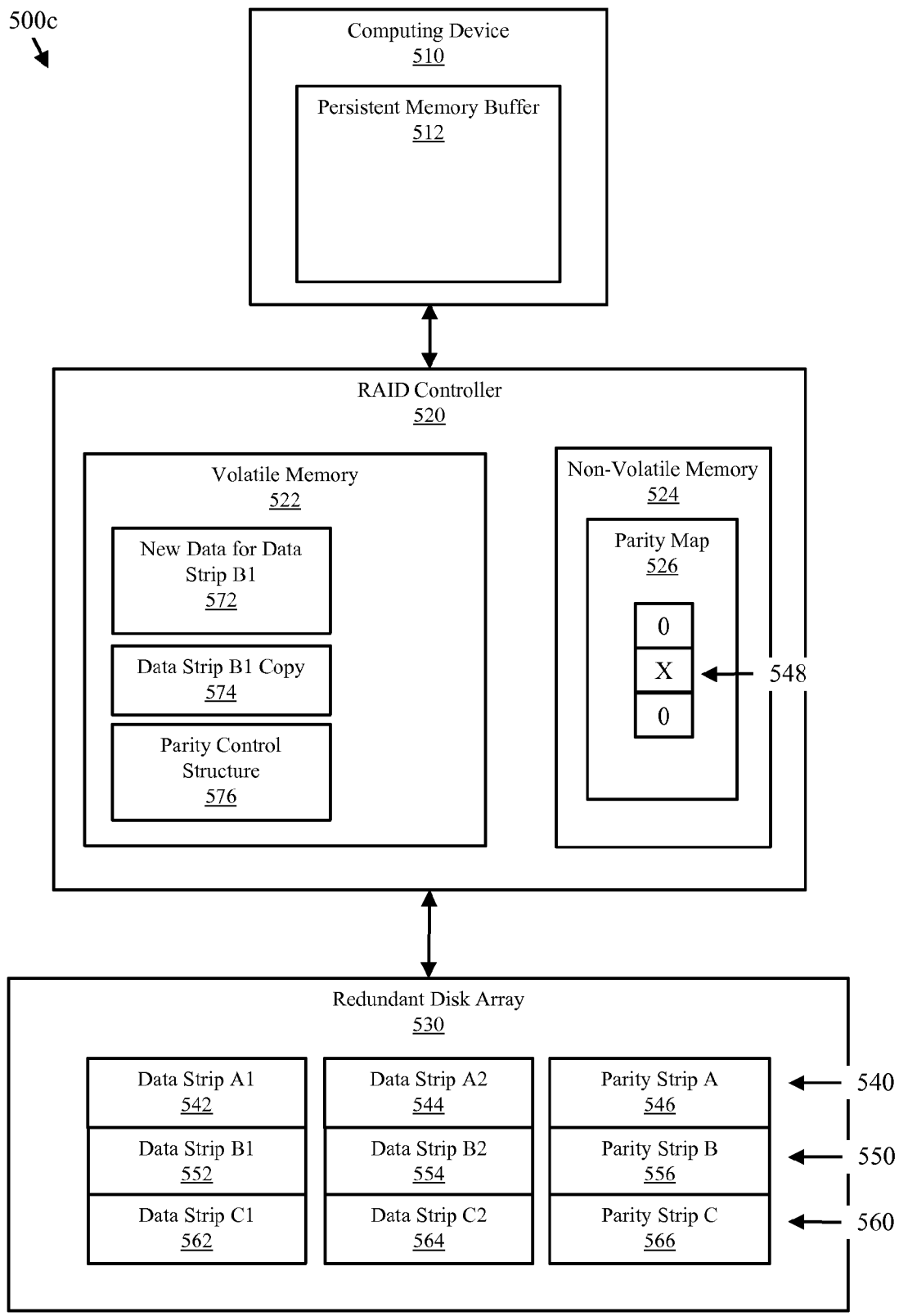
Figure 5D:
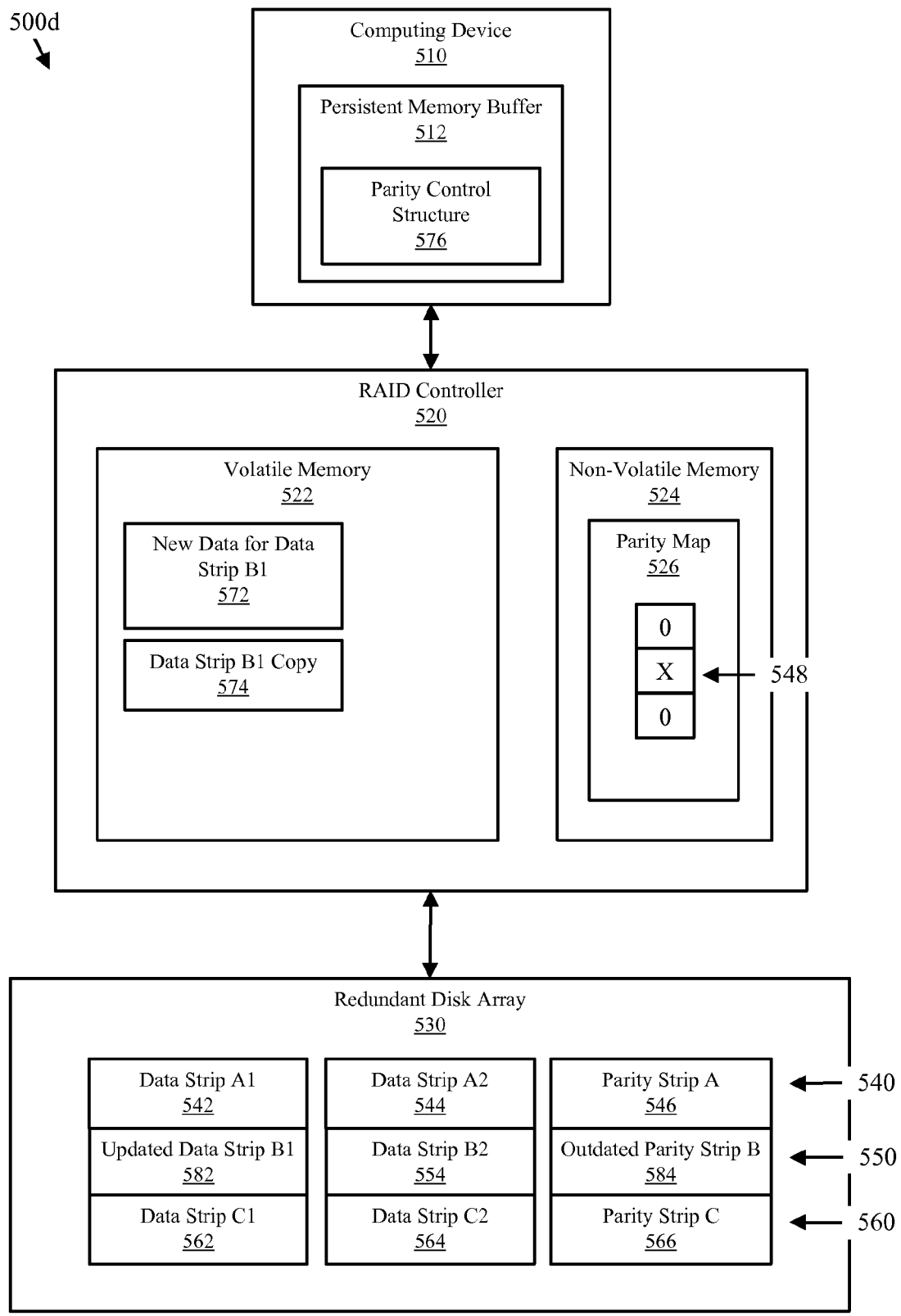

Referring to FIG. 5c, the RAID controller 520 then creates a parity control structure 576 that includes information for updating the redundant disk array with the new data for data strip B1 (572). For example, the parity control structure may include data for restoring the parity map 526. Referring now to FIG. 5d, after the parity control structure 576 is created, the RAID controller 520 stores the parity control structure 576 in the persistent memory buffer 512. Then, the RAID controller 520 updates the redundant disk array 530 with the new data for data strip B1 (572) resulting in an updated data strip B1 (582). The RAID controller 520 may then communicate a data committed message to the computing device 510. It should be noted that at this point, the parity strip B is outdated 584 because no parity strip update has been performed.

Figure 5E:
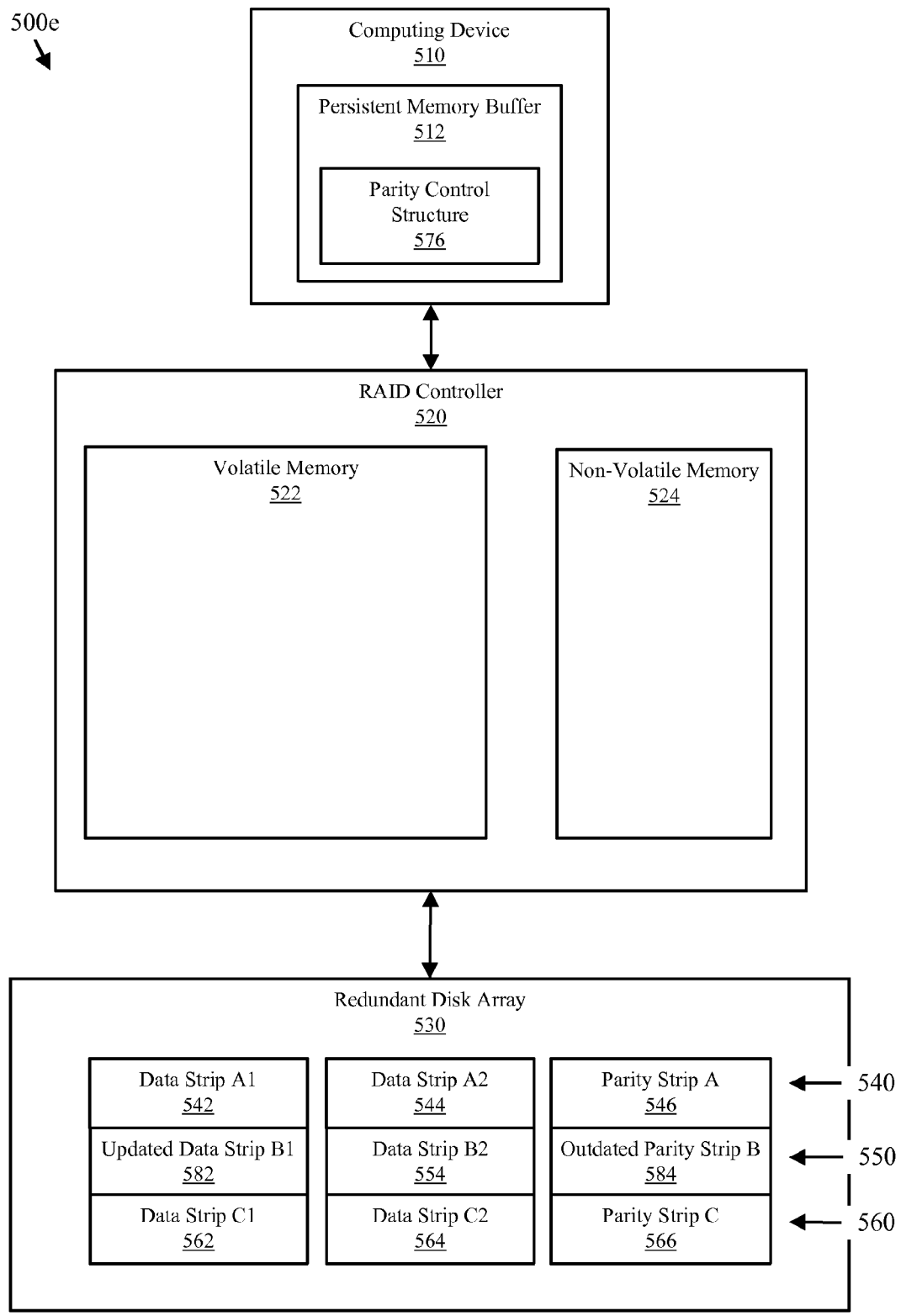
Figure 5F:
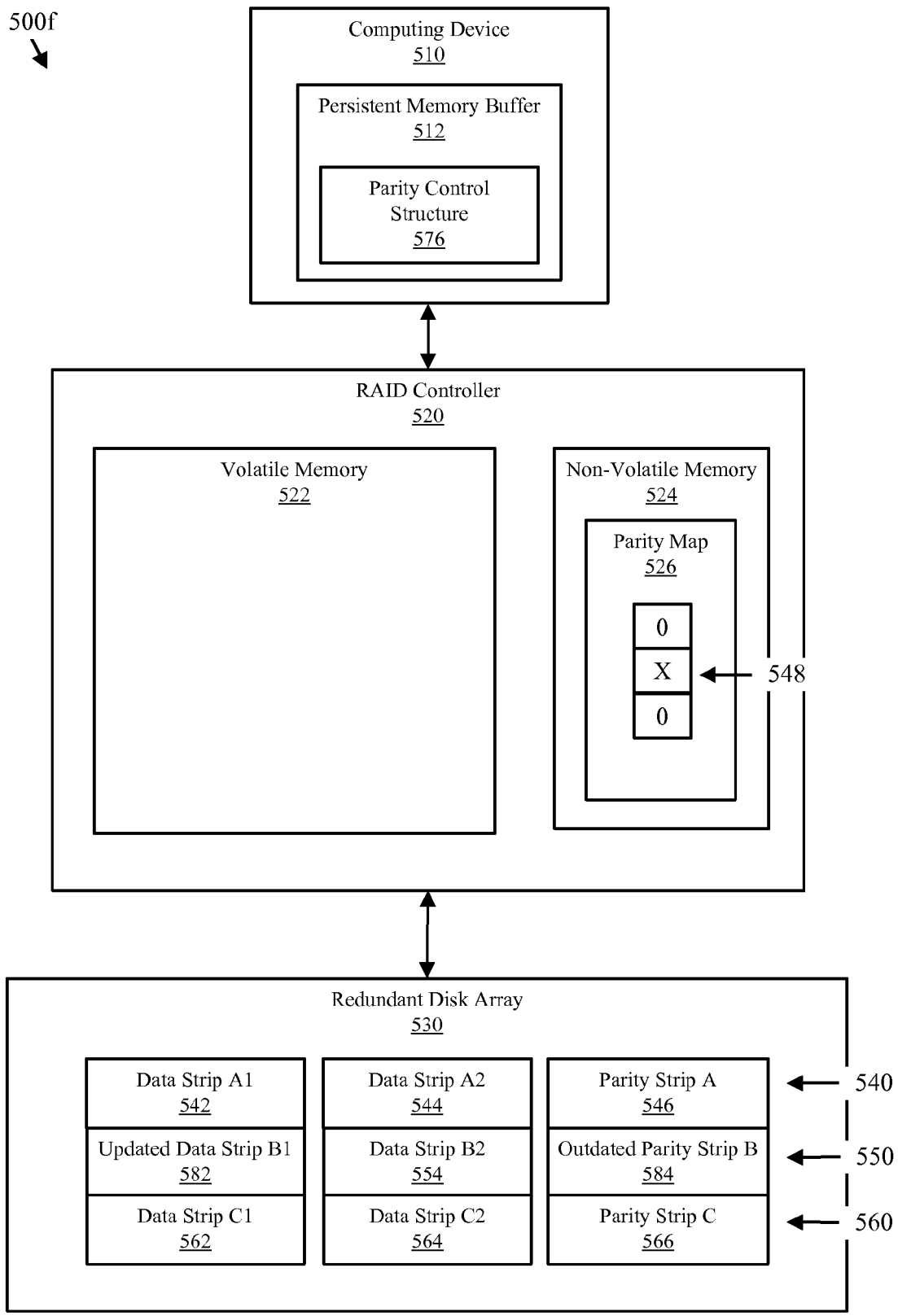

Referring to FIG. 5e, a RAID controller failure event occurs that results in a loss of volatile memory data and non-volatile memory data. As such, the RAID controller 520 is unable to determine the up-to-date status of the redundant disk array 530. However, referring to FIG. 5f, because the parity control structure 576 is stored in the persistent memory buffer 512, the RAID controller 520 may restore the parity map 526 to the non-volatile memory 524 as part of a data recovery operation. As depicted, the parity map 526 indicates with an "X" 548 that data stripe 550 is currently inconsistent and requires updating.

Figure 5G:
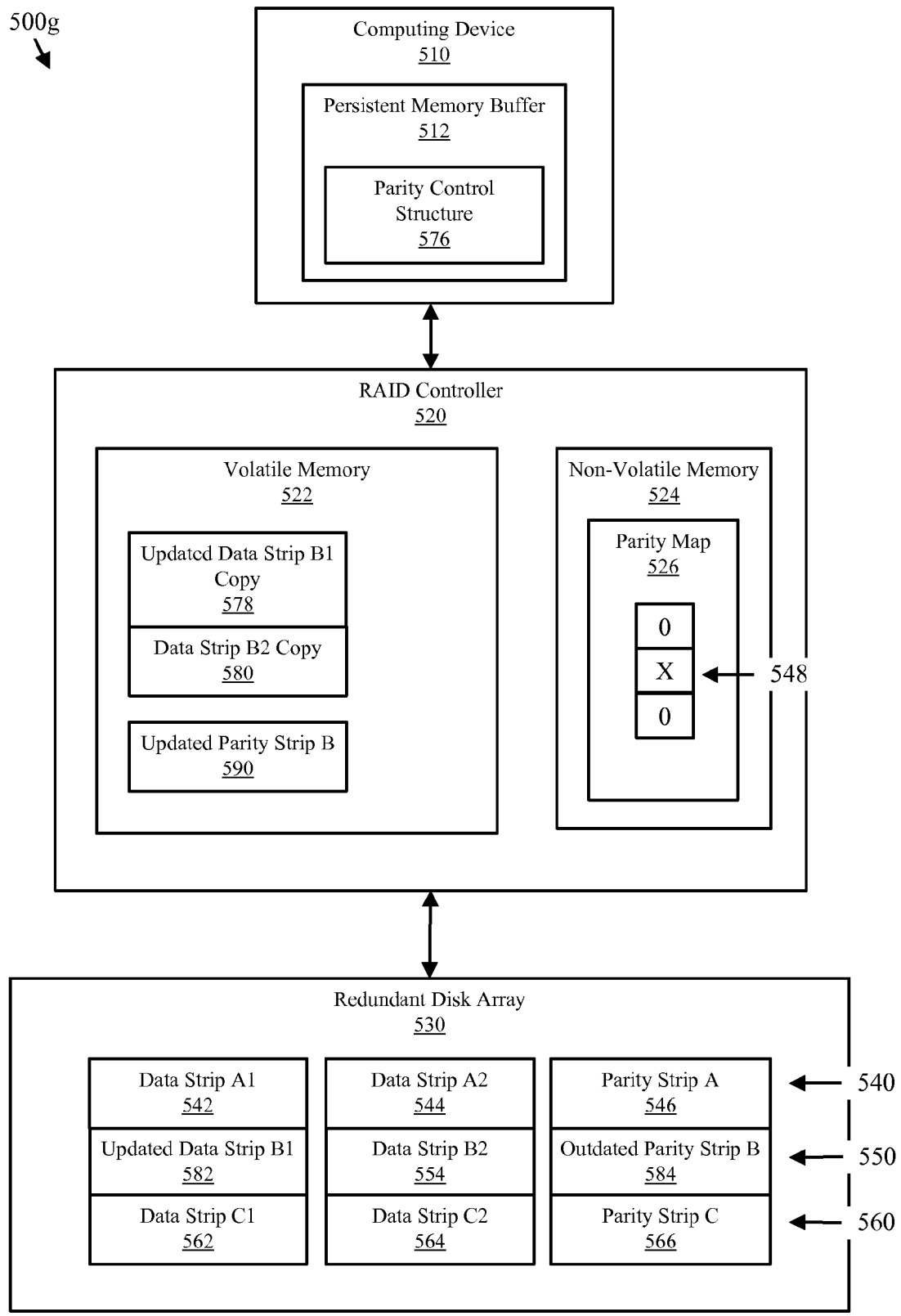
Figure 5H:
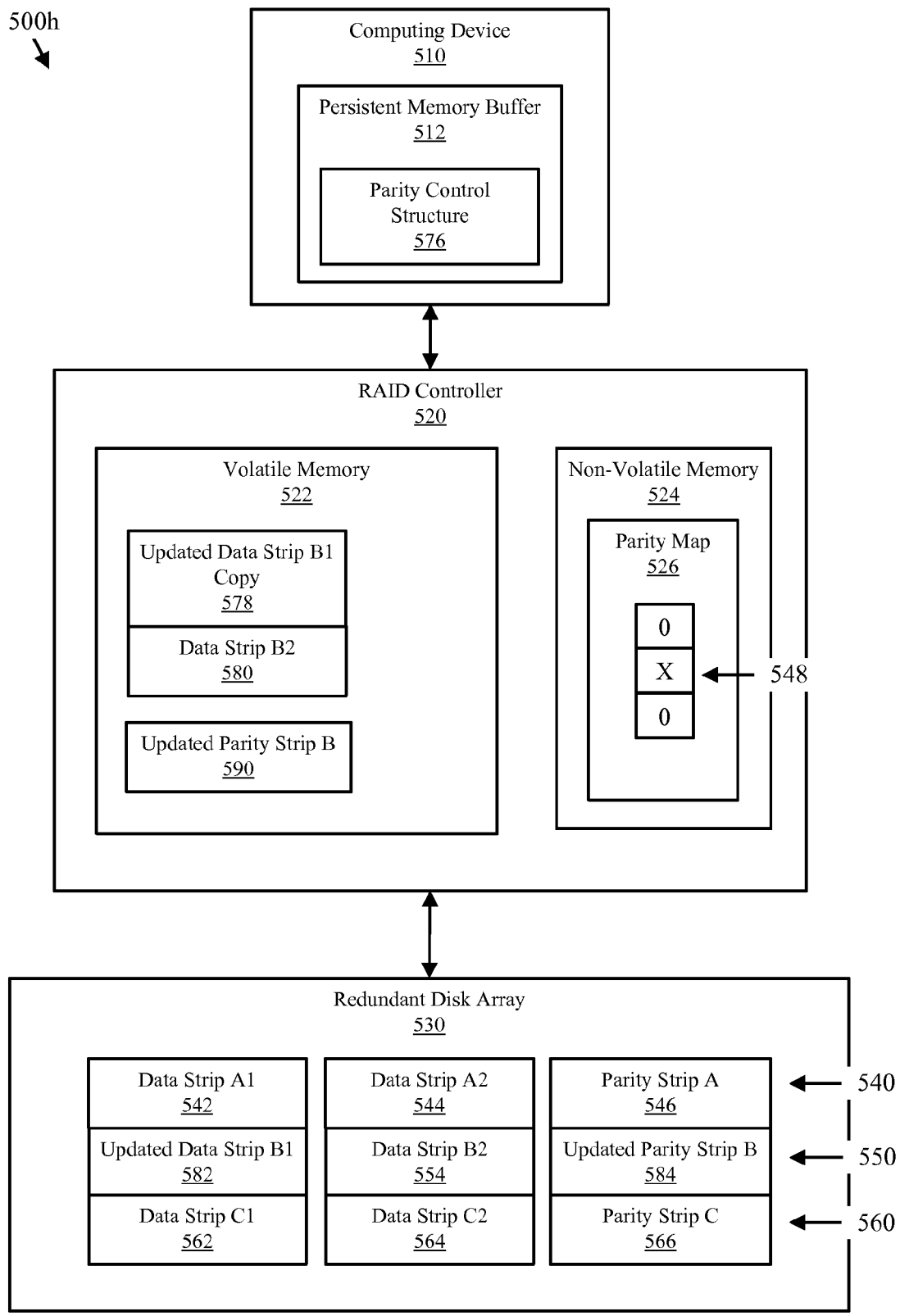
Figure 5I:
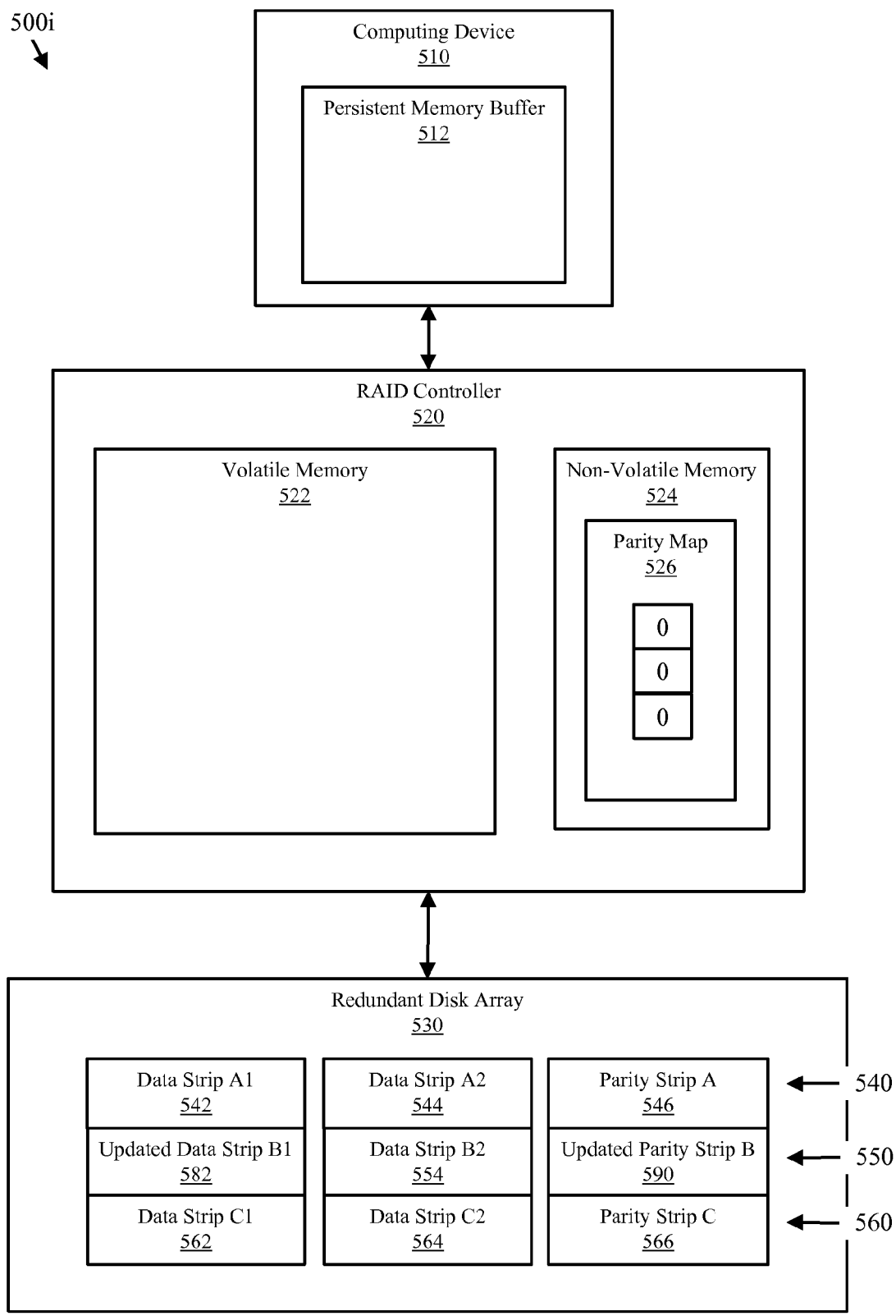

Accordingly, referring to FIG. 5g, the RAID controller 520 creates a copy of the updated data strip B1 (570) and a copy of data strip B2 (580) in the volatile memory, and thereby derives an updated parity strip B (590). Referring to FIG. 5h, the updated parity strip B (590) may be committed to the redundant disk array 530 to create an updated parity strip B (584). Referring to FIG. 5i, now that the redundant disk array 530 is entirely updated, the RAID controller 520 may remove any data in the volatile memory 522, update the parity map 526 to reflect the updated redundant disk array 530, and remove the parity control structure stored in the persistent memory buffer 512.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for parity data management, the method comprising:
   receiving by way of a RAID controller a write command comprising write data from a computing device, the computing device configured to access a redundant disk array by way of the RAID controller;
   building a parity control structure in accordance with updating at least one data stripe of the redundant disk array with the write data;
   storing the parity control structure in a persistent memory buffer of the computing device, wherein the RAID controller is configured to utilize direct memory access of the persistent memory buffer of the computing device to store the parity control structure;

updating the at least one data stripe with the write data in accordance with a RAID controller parity map; and restoring the RAID controller parity map from the parity control structure stored in the persistent memory buffer as part of a data recovery operation if updating the at least one data stripe is interrupted by a RAID controller failure resulting in a loss of the RAID controller parity map.

2. The method of claim 1, wherein the parity control structure comprises a copy of the RAID controller parity map.

3. The method of claim 2, wherein the parity control structure further comprises additional data configured to facilitate updating the at least one data stripe.

4. The method of claim 1, further comprising discarding the parity control structure from the persistent memory of the computing device once the at least one data stripe is updated with the write data.

5. The method of claim 1, further comprising communicating a data strip updated message to the computing device once each data strip corresponding to the write data is successfully updated with the write data.

6. The method of claim 1, further comprising communicating the parity control structure to a RAID controller configured to store the parity control structure in the persistent memory buffer of an additional computing device and restoring the RAID controller parity map from the additional computing device if restoration of the RAID controller parity map from the computing device is unsuccessful.

7. A signal bearing medium tangibly embodying a program of machine-readable instructions executable by a digital processing apparatus to perform operations for parity data management, the operations comprising:

receiving by way of a RAID controller a write command comprising write data from a computing device, the computing device configured to access a redundant disk array by way of the RAID controller;

building a parity control structure in accordance with updating at least one data stripe of the redundant disk array with the write data;

storing the parity control structure in a persistent memory buffer of the computing device, wherein the RAID controller is configured to utilize direct memory access of the persistent memory buffer of the computing device to store the parity control structure in the persistent memory buffer of the electronic device;

updating the at least one data stripe with the write data in accordance with a RAID controller parity map; and restoring the RAID controller parity map from the parity control structure stored in the persistent memory buffer as part of a data recovery operation if updating the at least one data stripe is interrupted by a RAID controller failure resulting in a loss of the RAID controller parity map.

8. The signal bearing medium of claim 7, wherein the parity control structure comprises a copy of the RAID controller parity map.

9. The signal bearing medium of claim 8, wherein the parity control structure further comprises additional data configured to facilitate updating the at least one data stripe.

10. The signal bearing medium of claim 7, further comprising discarding the parity control structure from the persistent memory of the computing device once the at least one data stripe is updated with the write data.

11. The signal bearing medium of claim 7, further comprising communicating a data strip updated message to the computing device once each data strip corresponding to the write data is successfully updated with the write data.

12. The signal bearing medium of claim 7, further comprising communicating the parity control structure to a RAID controller configured to store the parity control structure in the persistent memory buffer of an additional computing device and restoring the RAID controller parity map from the additional computing device if restoration of the RAID controller parity map from the computing device is unsuccessful.

13. A parity data management system, the system comprising:

a first computing device configured to communicate a write command comprising write data to a first RAID controller;

the first RAID controller configure to receive the write command and build a parity control structure in accordance with updating at least one data stripe of the redundant disk array with the write data;

the first RAID controller further configured to store the parity control structure in a persistent memory buffer of the first computing device, wherein the first RAID controller is configured to utilize direct memory access of the persistent memory buffer of the computing device to store the parity control structure;

the first RAID controller further configured to update the at least one data stripe with the write data in accordance with a RAID controller parity map; and the first RAID controller further configured to restore the RAID controller parity map from the parity control structure stored in the persistent memory buffer of the first computing device as part of a data recovery operation if updating the at least one data stripe is interrupted by a RAID controller failure resulting in a loss of the RAID controller parity map.

14. The system of claim 13, wherein first RAID controller is further configured to discard the parity control structure from the persistent memory of the computing device once the at least one data stripe is updated with the write data.

15. The system of claim 13, wherein the first RAID controller is further configured to communicate a data strip updated message to the computing device once each data strip corresponding to the write data is successfully updated with the write data.

16. The system of claim 13, wherein the first RAID controller is further configured to communicate the parity control structure to a second RAID controller configured to communicate the parity control structure to a second computing device.

17. The system of claim 16, wherein the first RAID controller is further configured to restore the RAID controller parity map from the additional computing device if restoration of the RAID controller parity map from the computing device is unsuccessful.

18. The system of claim 16, wherein the second RAID controller is configured to restore the RAID controller parity map from the parity control structure stored in the persistent memory buffer of the first computing device as part of a data recovery operation if updating the at least one data stripe is interrupted by a RAID controller failure resulting in a loss of the RAID controller parity map.

19. A parity data management system, the system comprising:

a first computing device configured to communicate a write command comprising write data to a first RAID controller;

the first RAID controller configured to build a parity control structure in accordance with updating at least one data stripe of a redundant disk array with the write data;

the first RAID controller further configured to store the parity control structure in a persistent memory buffer of the first computing device;

the first RAID controller further configured to communicate the parity control structure to a second RAID controller;

the second RAID controller configured to store the parity control structure in a persistent memory buffer of a second computing device;

the first RAID controller further configured to update the at least one data stripe with the write data in accordance with a RAID controller parity map; and the first RAID controller further configured to restore the RAID controller parity map from the parity control structure stored in the persistent memory buffer of the first computing device as part of a data recovery operation if updating the at least one data stripe is interrupted by a RAID controller failure resulting in a loss of the RAID controller parity map;

the first RAID controller further configured to restore the RAID controller parity map from the parity control structure stored in the persistent memory buffer of the second computing device as part of a data recovery operation if restoration of the RAID controller parity map from the first computing device is unsuccessful.

* * * * *